US012801138B2

(12) United States Patent
Hou

(10) Patent No.: US 12,801,138 B2
(45) Date of Patent: Nov. 17, 2026

(54) METHOD AND APPARATUS FOR BYPASSING AN OBJECT, MEDIUM AND ELECTRONIC DEVICE

(71) Applicant: Beijing Roborock Innovation Technology Co., Ltd., Beijing (CN)

(72) Inventor: Zhengtao Hou, Beijing (CN)

(73) Assignee: BEIJING ROBOROCK INNOVATION TECHNOLOGY CO., LTD., Beijing (CN)

( * ) Notice: Subject to any disclaimer, the term of this patent is extended or adjusted under 35 U.S.C. 154(b) by 176 days.

(21) Appl. No.: 18/251,867

(22) PCT Filed: Jun. 30, 2021

(86) PCT No.: PCT/CN2021/103756
§ 371 (c)(1),
(2) Date: May 4, 2023

(87) PCT Pub. No.: WO2022/095479
PCT Pub. Date: May 12, 2022

(65) Prior Publication Data
US 2024/0012421 A1 Jan. 11, 2024

(30) Foreign Application Priority Data
Nov. 4, 2020 (CN) .......................... 202011218792.1

(51) Int. Cl.
*G05D 1/00* (2024.01)

(52) U.S. Cl.
CPC .................................. *G05D 1/0214* (2013.01)

(58) Field of Classification Search
CPC .................................................... G05D 1/0214
See application file for complete search history.

(56) References Cited

U.S. PATENT DOCUMENTS

2013/0116880 A1* 5/2013 Shitamoto ............ G05D 1/0223 701/25
2014/0288709 A1* 9/2014 Sim ........................ G05D 1/024 700/259
(Continued)

FOREIGN PATENT DOCUMENTS

CN 102138769 A 8/2011
CN 106272431 A 1/2017
(Continued)

OTHER PUBLICATIONS

International Search Report from PCT/CN2021/103756 dated Sep. 24, 2021.
(Continued)

*Primary Examiner* — Paul W Arellano
(74) *Attorney, Agent, or Firm* — Calfee, Halter & Griswold LLP

(57) ABSTRACT

A method for circumventing an object includes: in response to detecting an object to be circumvented in a walking process of a self-walking device, moving, by the self-walking device and according to information of the object to be circumvented, to an observation position in a direction away from the object; an included angle between a connection line direction and an original walking direction of the self-walking device before movement does not exceed 90 degrees, and the connection line direction extends from a center point of the object to the observation position; and determining, by the self-walking device, a navigation route according to observation information obtained at the observation position, and performing, by the self-walking device, navigation according to the navigation route.

20 Claims, 3 Drawing Sheets

(56) References Cited

U.S. PATENT DOCUMENTS

| | | | | |
|---|---|---|---|---|
| 2017/0332868 | A1* | 11/2017 | Nam | A47L 9/1691 |
| 2018/0116475 | A1 | 5/2018 | So | |
| 2018/0246520 | A1* | 8/2018 | Martinson | G05D 1/0094 |
| 2018/0267552 | A1 | 9/2018 | Artes et al. | |
| 2019/0184571 | A1* | 6/2019 | Hou | A47L 1/00 |
| 2020/0069125 | A1* | 3/2020 | Gritsenko | A47L 9/009 |
| 2020/0133291 | A1* | 4/2020 | Xiao | G05D 1/0242 |
| 2020/0331148 | A1* | 10/2020 | Zhang | A47L 11/4011 |
| 2020/0333790 | A1* | 10/2020 | Kobayashi | G01S 17/89 |
| 2021/0389447 | A1* | 12/2021 | Shams | G01S 13/82 |

FOREIGN PATENT DOCUMENTS

| | | | |
|---|---|---|---|
| CN | 106772421 | A | 5/2017 |
| CN | 107272699 | A | 10/2017 |
| CN | 107966711 | A | 4/2018 |
| CN | 108181904 | A | 6/2018 |
| CN | 108226951 | A | 6/2018 |
| CN | 108490945 | A | 9/2018 |
| CN | 108521787 | A | 9/2018 |
| CN | 109426264 | A | 3/2019 |
| CN | 110870720 | A | 3/2020 |
| CN | 111026114 | A | 4/2020 |
| CN | 111090282 | A | 5/2020 |
| CN | 111505652 | A | 8/2020 |
| CN | 111844072 | A | 10/2020 |
| CN | 111857155 | A | 10/2020 |
| CN | 112327847 | A | 2/2021 |
| JP | 2006018726 | A | 1/2006 |
| WO | 2019041155 | A1 | 3/2019 |

OTHER PUBLICATIONS

Office action from Chinese Application No. 202011218792.1 dated Apr. 26, 2022.

Extended European Search Report of EP application No. 21888181.1 dated May 14, 2024.

Notice of Allowance of CN application No. 202011218792.1 dated Jun. 22, 2026.

* cited by examiner

METHOD AND APPARATUS FOR BYPASSING AN OBJECT, MEDIUM AND ELECTRONIC DEVICE

CROSS-REFERENCE TO RELATED APPLICATION

This application is the U.S. national phase application of PCT Application No. PCT/CN2021/103756, filed on Jun. 30, 2021, which is based on and claims the priority of the Chinese Patent Application No. 202011218792.1, filed on Nov. 4, 2020, and the entire contents of which are hereby incorporated by reference in their entirety.

TECHNICAL FIELD

The present disclosure relates to the field of self-walking devices, and in particular to a method and apparatus for circumventing an object, a medium and an electronic device.

BACKGROUND

Self-walking devices, such as sweeping robots and mopping robots, are smart home devices that can automatically clean the ground, and can automatically complete the cleaning of a floor in a room by means of artificial intelligence. The self-walking device generally adopts brushing and vacuuming modes to suck ground debris into its own garbage storage box, thereby completing the function of ground cleaning.

Since dust is generally easy to accumulate at the edge of a wall, in daily cleaning work, it is one of main tasks of the self-walking device to clean the garbage along the edge of the wall. In the related art, in an along-the-wall working mode, the self-walking device usually adopts an along-the-wall obstacle avoidance strategy to circumvent a current obstacle when encountering the obstacle in front. However, when there is a continuous irregular obstacle on the edge of the wall (for example, a chair of a hard material and/or a towel of a soft material) or a hidden obstacle behind a wall corner, since the obstacle cannot be predicted, the self-walking device can easily collide with the hidden obstacle if simply adopting the along-the-wall obstacle avoidance strategy, and the hidden obstacle can only be circumvented before repeated recognition. The time for repeated recognition prolongs the cleaning time of the self-walking device.

SUMMARY

The summary section is provided to briefly introduce the concepts that are described in detail in the following section of detailed description. The summary section is neither intended to identify key features or essential features of the claimed technical solutions, nor intended to limit the scope of the claimed technical solutions.

According to specific embodiments of the present disclosure, in a first aspect, the present disclosure provides a method for circumventing an object, including:

if detecting an object to be circumvented in a walking process of a self-walking device, moving, by the self-walking device and according to information of the object to be circumvented, to an observation position away from the object to be circumvented; wherein an included angle between a connection line direction and a walking direction of the self-walking device before movement does not exceed 90 degrees, and the connection line direction extends from a center point of the object to be circumvented to the observation position; and planning a navigation route according to observation information obtained at the observation position, and performing navigation according to the navigation route.

According to specific embodiments of the present disclosure, in a second aspect, the present disclosure provides a non-transitory computer-readable storage medium, storing a computer program, wherein the computer program, when executed by a processor, implements the method for circumventing an object according to any one of the first aspect.

According to specific embodiments of the present disclosure, in a third aspect, the present disclosure provides an electronic device, including: one or more processors; and a storage apparatus, used for storing one or more programs, wherein the one or more programs, when executed by the one or more processors, enable the one or more processors to implement the method for circumventing an object according to any one of the first aspect.

BRIEF DESCRIPTION OF THE DRAWINGS

The above and other features, advantages and aspects of various embodiments of the present disclosure will become more apparent in conjunction with the accompanying drawings and with reference to the following detailed embodiments. Throughout the drawings, the same or similar reference signs refer to the same or similar elements. It should be understood that the drawings are schematic and that components and elements are not necessarily drawn to scale. In the drawings.

DETAILED DESCRIPTION

Figure 1:
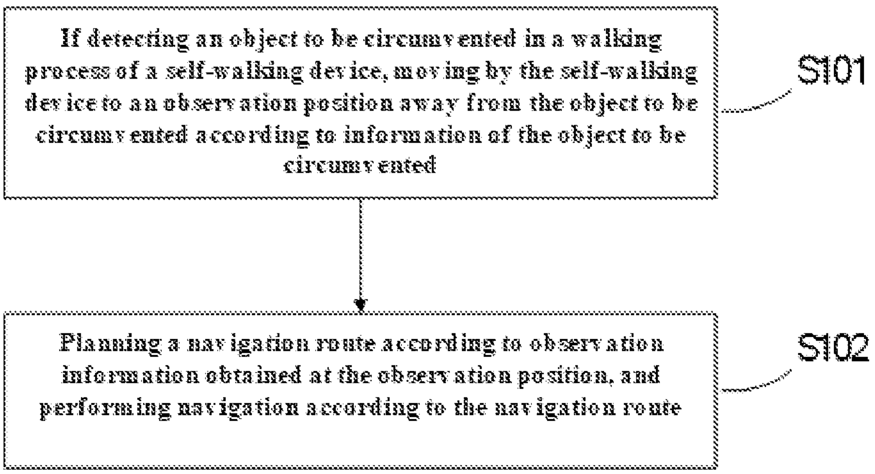
FIG. 1 shows a flowchart of a method for circumventing an object according to an embodiment of the present disclosure.

Embodiments of the present disclosure will be described in more detail below with reference to the accompanying drawings. Although certain embodiments of the present disclosure are shown in the drawings, it should be understood that the present disclosure may be embodied in various forms and should not be construed as limited to the embodiments set forth herein. Instead, these embodiments are provided for the purpose of a more thorough and complete understanding of the present disclosure. It should be understood that the drawings and embodiments of the present disclosure are only for exemplary purposes, and are not intended to limit the protection scope of the present disclosure.

It should be understood that various steps described in the method embodiments of the present disclosure may be executed in different orders and/or in parallel. Furthermore, the method embodiments may include additional steps and/or omit the execution of the illustrated steps. The scope of the present disclosure is not limited in this regard.

As used herein, the term “includes” and variations thereof are open-ended inclusions, i.e., “includes but not limited to”. The term “based on” is “at least partially based on”. The term “one embodiment” means “at least one embodiment”; the term “another embodiment” means “at least one additional embodiment”; the term “some embodiments” means “at least some embodiments”. Relevant definitions of other terms will be given in the descriptions below.

It should be noted that concepts such as “first” and “second” mentioned in the present disclosure are only used to distinguish different apparatuses, modules or units, and are not used to limit the order or interdependence of functions executed by these apparatuses, modules or units.

It should be noted that the modifications of “one” and “a plurality of” mentioned in the present disclosure are illustrative rather than restrictive, and those skilled in the art should understand that unless the context clearly indicates otherwise, they should be understood as “one or a plurality of”.

An object of the present disclosure is to provide a method and apparatus for circumventing an object, a medium and an electronic device, which can solve at least one of the technical problems mentioned above. The specific solution is as follows.

The present disclosure provides a method and apparatus for circumventing an object, a medium and an electronic device. When detecting an object to be circumvented in a walking process of a self-walking device, the self-walking device first moves to an observation position away from the object to be circumvented, observes the circumstance around the object to be circumvented at the observation position, and plans a navigation route accordingly. The collision probability between the self-walking device and a hidden obstacle is reduced, the time for repeatedly recognizing the hidden obstacle is saved, and the walking efficiency is improved.

The names of messages or information exchanged between multiple apparatuses in the embodiments of the present disclosure are only for illustrative purposes, and are not intended to limit the scope of the messages or information.

Optional embodiments of the present disclosure will be described in detail below with reference to the accompanying drawings.

The first embodiment according to the present disclosure is an embodiment of a method for circumventing an object.

The embodiment of the present disclosure provides an application scenario. The application scenario includes a self-walking device, such as a sweeping robot, a mopping robot, a vacuum cleaner, a lawn mower, and so on. By taking the household sweeping robot as an example, in a walking process, the sweeping robot will encounter some objects that need to be circumvented in a walking direction (for example, a stool randomly placed in the walking direction or a wall corner). At this time, since the information behind the object to be circumvented cannot be known through the existing obstacle avoidance strategy, the sweeping robot is caused to accidently collide with the hidden obstacle behind the object to be circumvented after circumventing the object to be circumvented. The sweeping robot can only circumvent the hidden obstacle after multiple times of collision and recognition. As a result, the sweeping robot consumes a lot of time.

In view of the above problem, the embodiment of the present disclosure provides a method for circumventing an object, and the embodiment of the present disclosure is described as shown in FIG. 1.

In the step S101, if detecting an object to be circumvented in a walking process, the self-walking device moves, according to information of the object to be circumvented, to an observation position away from the object to be circumvented.

An included angle between a connection line direction and a walking direction of the self-walking device before movement does not exceed 90 degrees. The connection line direction extends from a center point of the object to be circumvented to the observation position.

The “before movement” refers to before the self-walking device moves away from the object to be circumvented, and the “walking direction before movement” is a heading direction of the self-walking device along an original planned route.

In the step S102, a navigation route is planned according to observation information obtained at the observation position, and navigation is performed according to the navigation route.

In the embodiment of the present disclosure, when detecting the object to be circumvented in the walking process, the self-walking device first moves to the observation position away from the object to be circumvented, observes at the observation position the circumstance around the object to be circumvented, and plans the navigation route accordingly. The purpose is to reduce the collision probability between the self-walking device and the hidden obstacle, the time for repeatedly recognizing the hidden obstacle is saved, and the walking efficiency is improved.

Figure 2:
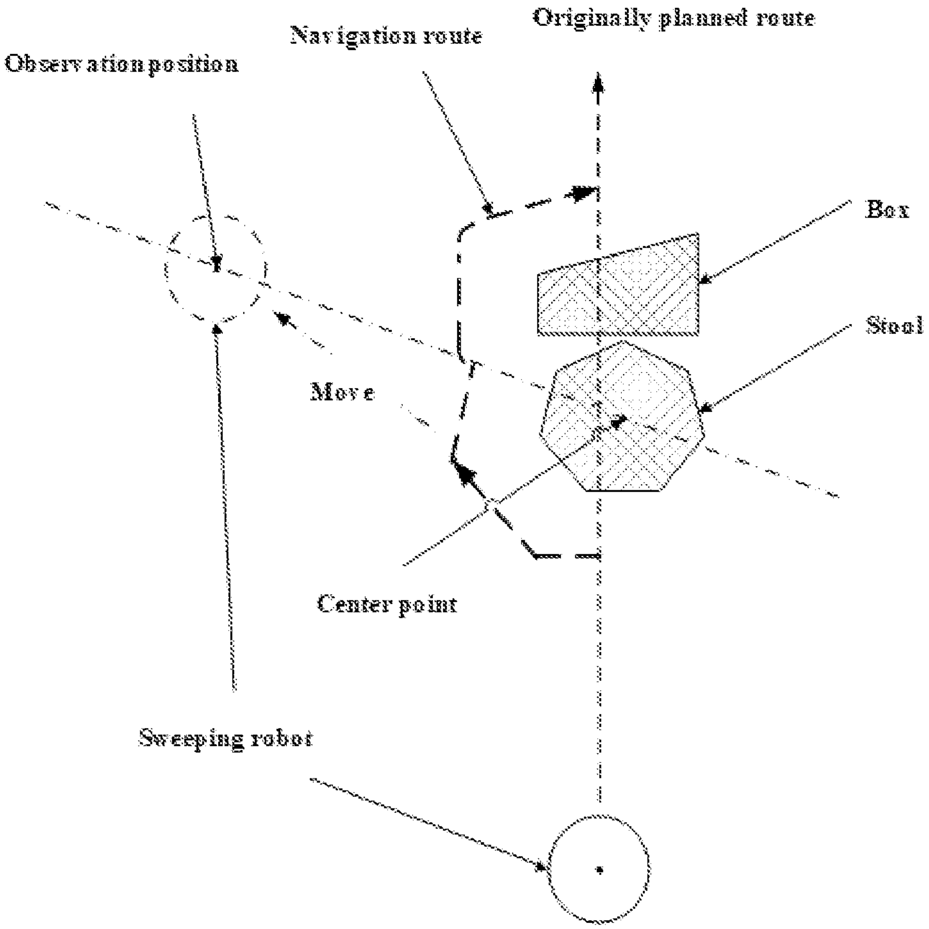
FIG. 2 shows a schematic diagram of circumventing an obstacle of a method for circumventing an object according to an embodiment of the present disclosure.
Figure 3:
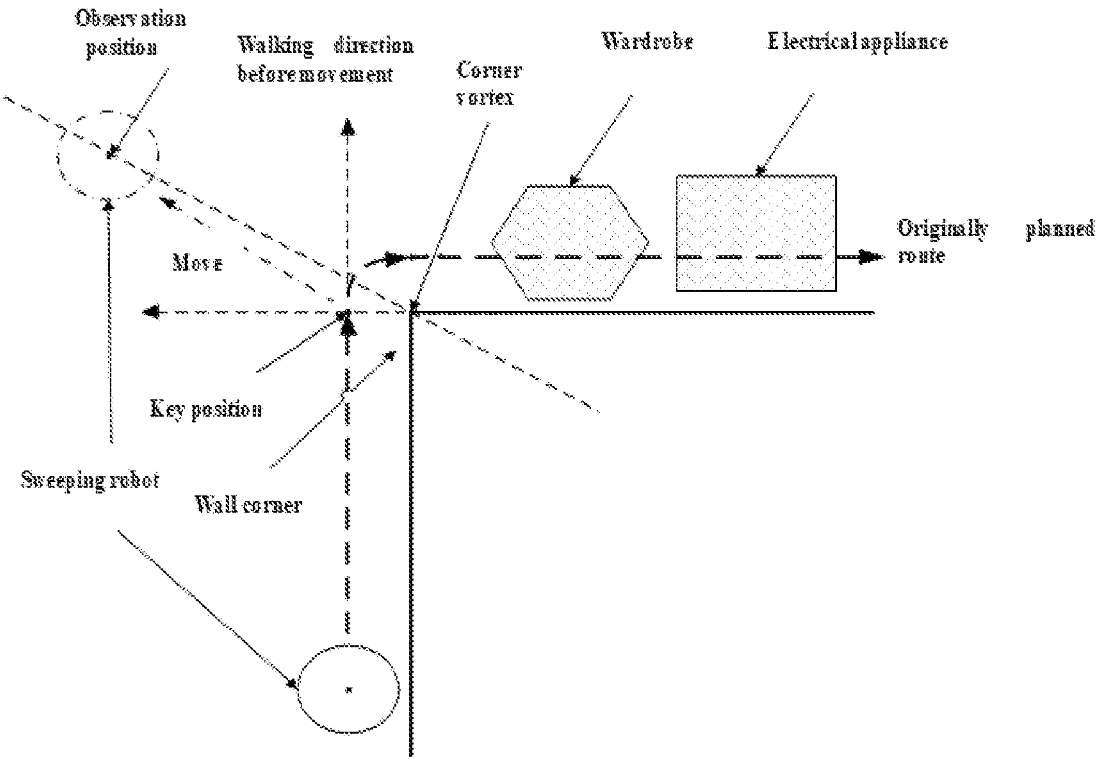
FIG. 3 shows a schematic diagram of circumventing a wall corner of a method for circumventing an object according to an embodiment of the present disclosure.

The embodiment of the present disclosure will be described in detail below in combination with FIG. 2 and FIG. 3.

In a first specific application, the obstacle is an object that forces the self-walking device to change its original walking route. For example, as shown in FIG. 2, a stool that is randomly placed in the walking direction is blocked in front of the above sweeping robot. At this time, the stool is the obstacle in the walking direction of the sweeping robot. If intended to achieve the object of the embodiment of the present disclosure and continue walking according to the original planned route, the sweeping robot needs to recognize the circumstance around the stool and re-plan the navigation route. The center point of the obstacle is also a geometric center point of the obstacle, the sweeping robot moves to the observation position away from the stool, and the included angle between the connection line direction extending from the observation position to the center point of the stool and the heading direction of the original planned route of the sweeping robot before movement does not exceed 90 degrees, so that the sweeping robot can completely obtain the information around the stool at the observation position, so as to plan the navigation route.

Therefore, if detecting that the object to be circumvented is an obstacle, the planning the navigation route according to the observation information obtained at the observation position specifically includes the following step S102-11.

In the step S102-11, whether the observation information obtained at the observation position contains another obstacle located in the walking direction before the movement and located around the object to be circumvented is determined, and the navigation route is planned accordingly.

The another obstacle refer to the hidden obstacle behind the current obstacle, including: another obstacle with a boundary distance from the current obstacle being less than a first preset value. The first preset value is greater than or equal to a length or width of a machine body of the self-walking device. For example, as shown in FIG. 2, the sweeping robot has a length of 30 cm and a width of 30 cm, and the first preset value is set to be equal to 30 cm. When the distance between the stool and a box hidden behind the stool is less than 30 cm, the sweeping robot cannot enter between the stool and the box for cleaning. Therefore, the sweeping robot regards the stool and the box as the obstacles that need to be circumvented at the same time. When the distance between the stool and the box hidden behind the stool is greater than 30 cm, the sweeping robot can enter between the stool and the box for cleaning. Therefore, the sweeping robot regards the stool and the box as two obstacles that need to be circumvented respectively, firstly plans a navigation route for circumventing the stool, then returns to the original planned route after circumventing the stool, then plans a navigation route for circumventing the box after encountering the box, and then returns to the original planned route again after circumventing the box.

For some self-walking devices, the purpose of re-planning the navigation route is to enable the self-walking device to return to the original planned route and continue walking after circumventing the obstacle. For example, the above "the sweeping robot in the walking process" specifically includes: the sweeping robot in the walking process of an along-the-wall mode, that is, a working mode that the sweeping robot sweeps along the edge of the wall; the sweeping robot continues sweeping along the original planned route after circumventing the stool at the edge of the wall to avoid sweeping omission. Therefore, further, when determining that the observation information contains another obstacle located in the walking direction before the movement and located around the object to be circumvented, then the navigation route is a route of avoiding the object to be circumvented and the another obstacle, and ultimately returning to the walking direction before the movement.

When there are multiple hidden obstacles behind the current obstacle, the navigation route which can avoid the collision with other obstacles cannot be planned at the same time only through the observation information of one observation point. Therefore, optionally, in a specific application of the embodiment of the present disclosure, the following step S102-11-1 is further included:

In the step S102-11-1, in the process of avoiding the another obstacle, the self-walking device moves, according to information of the another obstacle, to an observation position away from the another obstacle, obtains the observation information, and plans the navigation route accordingly.

In this specific application, the self-walking device obtains the observation information through the observation position away from the obstacle, and plans the navigation route based on the observation information. The collision probability between the self-walking device and the hidden obstacles is reduced, the time for repeatedly recognizing the hidden obstacle is saved, and the walking efficiency is improved.

Further, in a second specific application based on the first specific application, when detecting that the object to be circumvented is an obstacle, the moving, according to the information of the object to be circumvented, to the observation position away from the object to be circumvented includes the following steps S101-11~S102-12.

In the step S101-11, according to an obstacle avoidance strategy, the obstacle is circumvented; in this circumventing process, when an included angle between the current walking direction and the walking direction before movement exceeds a preset angle value for the second time, the current position is marked as a key position.

The preset angle value is used as a condition for determining the key position. In the process that the self-walking device detects that the object to be circumvented is an obstacle and executes the obstacle avoidance strategy, when the included angle between the current walking direction and the walking direction before movement exceeds the preset angle value for the second time, the current position is determined as the key position.

In the step S101-12, the self-walking device moves, according to a preset strategy, from the key position to the observation position in a direction away from the obstacle.

The preset strategy includes: firstly rotating to the right by a preset angle, and then moving back by a preset distance.

For example, the sweeping robot walks from the left side of the stool to the key position based on the obstacle avoidance strategy, rotates to the right based on the preset angle of 120 degrees and stops, and then moves, in a direction away from the stool and based on the preset distance of 30 cm, back by 30 cm to the observation position.

In order to avoid the interruption of the walking route of the self-walking device, for example, the above sweeping robot moves to the observation position away from the object to be circumvented after detecting the object to be circumvented in the sweeping process, if based on the design of the shortest path, then the planned navigation route is to circumvent the obstacle directly from the observation position and return to the original planned route, and the sweeping robot will have the phenomenon of sweeping omission. Therefore, optionally, the planning the navigation route according to the observation information obtained at the observation position, and performing the navigation according to the navigation route specifically includes the step S102-31.

In the step S102-31, the self-walking device plans the navigation route according to the observation information obtained at the observation position, returns to the key position, and performs the navigation according to the navigation route.

When the self-walking device obtains the observation information at the observation position, the re-planned navigation route is to return to the key position, and circumvent the obstacle from the key position and return to the original planned route, thus ensuring the continuity of the walking route and avoiding the phenomenon of sweeping omission.

In a third specific application, the wall corner is an object that forces the self-walking device to change the current walking direction, so that the self-walking device in the walking process is in a state of ignorance of the information behind the wall corner. For example, as shown in FIG. 3, the sweeping robot located at one side of the wall corner and walking forward along the edge of the wall cannot predict a wardrobe behind the wall corner in advance before turning the corner. Therefore, in the related art, the sweeping robot will collide with the wardrobe after turning the corner. If intended to achieve the object of the embodiment of the present disclosure and continue walking according to the original planned route, the sweeping robot needs to know the circumstance behind the wall corner in advance, and plan the navigation route accordingly, herein, a center point of the wall corner is a corner vertex of the wall corner, the sweeping robot moves to the observation position away from the wall corner, and the included angle between the connection line direction extending from the observation position to the corner vertex of the wall corner and the walking direction of the sweeping robot before movement does not exceed 90 degrees, so that the sweeping robot can completely obtain the information behind the wall corner at this observation position to plan the navigation route.

Further, when detecting that the object to be circumvented is the wall corner, the moving, according to the information of the object to be circumvented, to the observation position away from the object to be circumvented includes the following steps S101-21~S101-22.

In the step S101-21, the self-walking device moves to the key position beside the wall corner along the current walking direction.

The included angle between the connection line direction extending from the corner vertex of the wall corner to the key position and the current walking direction is at most 90 degrees. For example, the included angle between the connection line direction extending from the corner vertex of the wall corner to the key position and the current walking direction is less than or equal to 90 degrees, such as 45 degrees, 60 degrees, 90 degrees, etc. For another example, the included angle between the connection line direction extending from the corner vertex of the wall corner to the key position and the current walking direction is around 90 degrees. Herein, the term "around 90 degrees" refers to a range of 80-110 degrees, such as 80 degrees, 90 degrees, 110 degrees, etc.

In the step S101-22, the self-walking device moves from the key position to the observation position in a direction away from the wall corner.

Optionally, if detecting that the object to be circumvented is the wall corner, the planning the navigation route according to the observation information obtained at the observation position specifically includes the following step S102-21.

In the step S102-21, whether the observation information obtained at the observation position contains an obstacle located behind the wall corner is determined, and the navigation route is planned accordingly.

The obstacle behind the wall corner is also the hidden obstacle behind the wall corner, for example, the above wardrobe, and when the observation information contains the wardrobe, the navigation route is re-planned according to wardrobe information.

For some self-walking devices, the purpose of re-planning the navigation route is to enable the self-walking device to return to the original planned route and continue walking after circumventing the obstacle. For example, the above "the sweeping robot in the walking process" specifically includes: the sweeping robot in the walking process of an along-the-wall mode, that is, a working mode that the sweeping robot sweeps along the edge of the wall. Therefore, further, when determining that the observation information contains the obstacle located behind the wall corner, the navigation route is a route of walking behind the wall corner and avoiding the obstacle.

When there are multiple hidden obstacles behind the wall corner, the navigation route which can avoid the collision with other obstacles cannot be planned at the same time only through the observation information of one observation point. Therefore, optionally, in the specific application of the embodiment of the present disclosure, the following step S102-21-1 is further included:

In the step S102-21-1, in the process of avoiding the obstacle, the self-walking device moves, according to the information of the obstacle, to the observation position away from the obstacle, obtains the observation information, and plans the navigation route accordingly.

In this specific application, the self-walking device obtains the observation information behind the wall corner through the observation position away from the wall corner, and plans the navigation route according to the observation information. The collision probability between the self-walking device and the hidden obstacle is reduced, the time for repeatedly recognizing the hidden obstacles is saved, and the walking efficiency is improved.

In the embodiment of the present disclosure, when detecting the object to be circumvented in the walking process, the self-walking device first moves to the observation position away from the object to be circumvented, observes the circumstance around the object to be circumvented at the observation position, and plans the navigation route accordingly. The collision probability between the self-walking device and the hidden obstacle is reduced, the time for repeatedly recognizing the hidden obstacle is saved, and the walking efficiency is improved.

Corresponding to the first embodiment according to the present disclosure, the present disclosure also provides a second embodiment, that is, an apparatus for circumventing an object. Since the second embodiment is basically similar to the first embodiment, the description is relatively simple, and for relevant parts, please refer to the corresponding description of the first embodiment. The apparatus embodiments described below are merely schematic.

Figure 4:
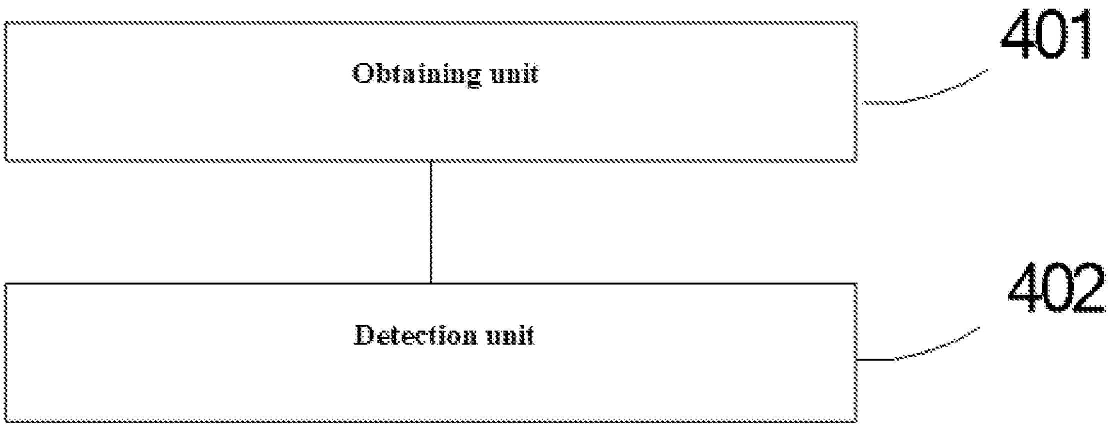
FIG. 4 shows a unit block diagram of an apparatus for circumventing an object according to an embodiment of the present disclosure.

FIG. 4 shows an embodiment of an apparatus for circumventing objects according to the present disclosure.

As shown in FIG. 4, the present disclosure provides an apparatus for circumventing objects, including:

- a detection unit 401, configured to, if detecting an object to be circumvented in a walking process of a self-walking device, move, according to information of the object to be circumvented, the self-walking device to an observation position away from the object to be circumvented; wherein an included angle between a connection line direction extending from a center point of the object to be circumvented to the observation position and a walking direction of the self-walking device before movement does not exceed 90 degrees; and
- a planning unit 402, configured to plan a navigation route according to observation information obtained at the observation position, and perform navigation according to the navigation route.

Optionally, if detecting that the object to be circumvented is an obstacle, the planning unit is specifically configured to determine whether the observation information obtained at the observation position contains another obstacle located in the walking direction before the movement and located around the object to be circumvented, and plan the navigation route accordingly.

Optionally, the planning unit is specifically configured to, when determining that the observation information contains the another obstacle located in the walking direction before the movement and located around the object to be circumvented, the navigation route is a route of avoiding the object to be circumvented and the another obstacle, and ultimately returning to the walking direction before the movement.

Optionally, the planning unit is also specifically configured to, in the process of avoiding the another obstacle, move, according to information of the another obstacle, to an observation position away from the another obstacle, obtain the observation information, and plan the navigation route accordingly.

Optionally, if detecting that the object to be circumvented is a wall corner, the planning unit is specifically configured to determine whether the observation information obtained at the observation position contains an obstacle located behind the wall corner, and plan the navigation route accordingly.

Optionally, the planning unit is specifically configured to, when determining that the observation information contains the obstacle located behind the wall corner, the navigation route is a route of walking behind the wall corner and avoiding the obstacle.

Optionally, when detecting that the object to be circumvented is an obstacle, the detection unit is specifically configured to:

- circumvent the obstacle according to an obstacle avoidance strategy;
- in a process of the circumventing, when an included angle between a current walking direction and the walking direction before movement exceeds a preset angle value for the second time, mark the current position as a key position; and
- move, according to a preset strategy, from the key position to the observation position in a direction away from the obstacle; and
- the planning unit is specifically configured to plan the navigation route according to the observation information obtained at the observation position, return to the key position, and perform navigation according to the navigation route.

Optionally, the preset strategy includes: firstly rotating to the right by a preset angle, and then moving back by a preset distance.

Optionally, when detecting that the object to be circumvented is a wall corner, the detection unit is specifically configured to:

- move to a key position beside the wall corner along the current walking direction; wherein an included angle between a connection line direction extending from a corner vertex of the wall corner to the key position and the current walking direction is at most 90 degrees; and
- move from the key position to the observation position in a direction away from the wall corner.

Optionally, the another obstacle located around the object to be circumvented includes: another obstacle with a boundary distance from the object to be circumvented being less than a first preset value; herein, the first preset value is greater than or equal to the length or width of a machine body.

Optionally, the walking process of the self-walking device specifically includes a walking process of the self-walking device in an along-the-wall mode.

In the embodiment of the present disclosure, when detecting the object to be circumvented in the walking process, the self-walking device first moves to the observation position away from the object to be circumvented, observes the circumstance around the object to be circumvented at the observation position, and plans the navigation route accordingly. The collision probability between the self-walking device and the hidden obstacle is reduced, the time for repeatedly recognizing the hidden obstacles is saved, and the walking efficiency is improved.

A third embodiment of the present disclosure provides an electronic device for implementing a method for circumventing an object. The electronic device includes at least one processor, and a memory in communication connection with the at least one processor.

Herein, the memory stores instructions executable by the at least one processor to cause the at least one processor to execute the method for circumventing an object according to the first embodiment.

A fourth embodiment of the present disclosure provides a computer storage medium for implementing a method for circumventing an object. The computer storage medium stores computer-executable instructions which can implement the method for circumventing an object according to the first embodiment.

Figure 5:
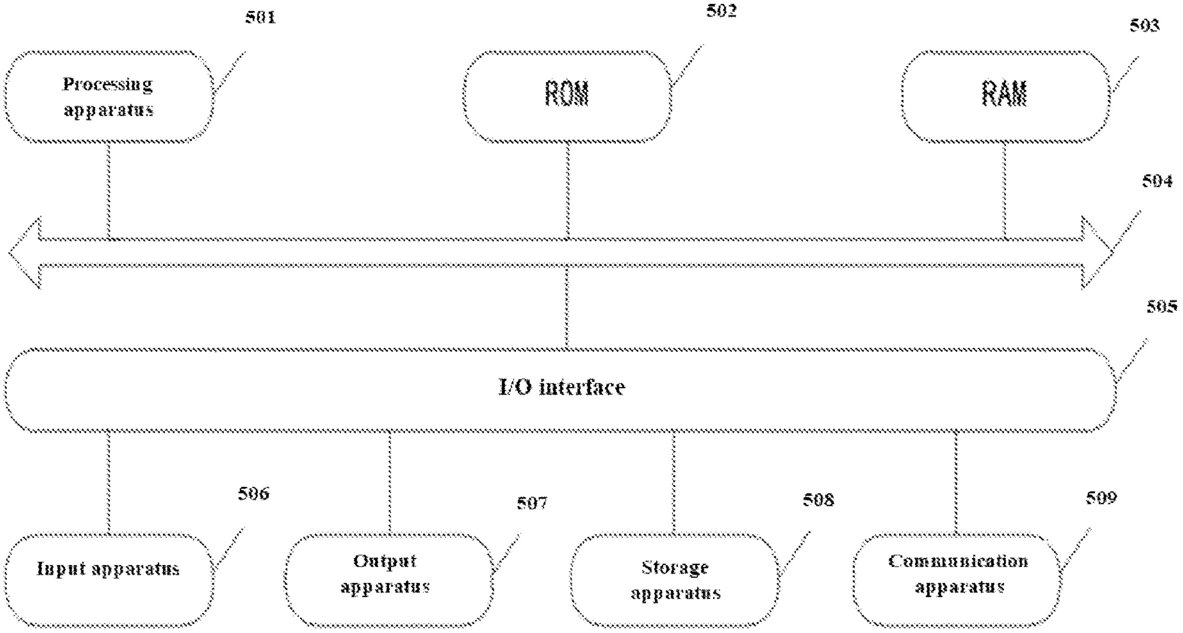
FIG. 5 shows a schematic diagram of a connection structure of an electronic device according to an embodiment of the present disclosure.

Referring to FIG. 5, which shows a schematic structural diagram of an electronic device for realizing an embodiment of the present disclosure. The electronic device of the present disclosure may be a mobile terminal which includes, but is not limited to, a mobile phone, a notebook computer, a digital broadcast receiver, a personal digital assistant (PDA), a tablet computer (PAD), a portable multimedia player (PMP), an onboard terminal (such as an onboard navigation terminal) and the like, or may be a fixed terminal such as a digital TV, a desk computer. The electronic device shown in FIG. 5 is only an example, and is not intended to limit the function and application range of the embodiments of the present disclosure.

As shown in FIG. 5, the electronic device may include a processing apparatus 501 (e.g., a central processing unit, a graphics processing unit or the like) which can execute various proper actions and processing according to programs stored in a read-only memory (ROM) or programs loaded into a random-access memory (RAM) 503 from a storage apparatus 508. Various programs and data required for the operation of the electronic device are also stored in the RAM 503. The processing apparatus 501, the ROM 502 and the RAM 503 are connected with each other by a bus 504. An input/output (I/O) interface 505 is also connected to the bus 504.

Generally, the following apparatuses may be connected to the I/O interface 505: an input apparatus 506 including, for example, a touch screen, a touchpad, a keyboard, a mouse, a camera, a microphone, an accelerometer, a gyroscope and the like; an output apparatus 507 including, for example, a liquid crystal display (LCD), a speaker, a vibrator and the like; a storage apparatus 508 including, for example, a magnetic tape, a hard disk and the like; and a communication apparatus 509. The communication apparatus 509 can allow the electronic device to carry out wired or wireless communication with other devices so as to exchange data. FIG. 5 shows the electronic device with various apparatuses, but it should be understood that all shown apparatuses are not required to be implemented or included. More or fewer apparatuses may be alternatively implemented or included.

Particularly, according to the embodiments of the present disclosure, the process described above with reference to the flow chart may be implemented as a computer software program. For example, a computer program product is provided according to an embodiment of the present disclosure, including a computer program carried on a non-transitory computer-readable medium, herein, the computer program contains a program code for executing the method shown in the flow chart. In such an embodiment, the computer program may be downloaded and installed from the network by the communication apparatus 509, or installed from the storage apparatus 508, or installed from the ROM 502. When the computer program is executed by the processing apparatus 501, the above functions defined in the method provided by the embodiment of the present disclosure are executed.

It should be noted that the above computer-readable storage medium in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, apparatus, or device, or a combination of any of the above. More specific examples of the computer-readable storage medium may include, but not limited to, an electrical connection with one or more wires, a portable computer disk, a hard disk, a random-access memory (RAM), a read-only memory (ROM), an erasable programmable read-only memory (EPROM or flash memory), optical fiber, a portable compact disk read-only memory (CD-ROM), an optical storage device, a magnetic storage device, or any suitable combination of the above. In the present disclosure, the computer-readable storage medium may be any tangible medium which contains or stores a program, and the program may be used by or in combination with an instruction execution system, apparatus, or device. In the present disclosure, the computer-readable signal medium may include a data signal propagated in a baseband or as part of a carrier wave, and a computer-readable program code is carried therein. This propagated data signal may be in many forms, including but not limited to, an electromagnetic signal, an optical signal, or any suitable combination of the above. The computer-readable signal medium may also be any computer-readable storage medium other than the computer-readable storage medium, and the computer-readable signal medium may send, propagate, or transmit the program for use by or in combination with the instruction execution system, apparatus, or device. The program code contained on the computer-readable storage medium may be transmitted by any suitable medium, including, but not limited to, a wire, an optical cable, radio frequency (RF), etc., or any suitable combination of the above.

In some embodiments, the client and the server can communicate by using any currently known or future-developed network protocol, for example, a Hyper Text Transfer Protocol (HTTP), and can be interconnected with any form or any medium of digital data communication (such as communication networks). Examples of the communication network include a local area network (LAN), a wide area network (WAN), an internet network (for example, the Internet), and an end-to-end network (for example, an ad hoc end-to-end network), and any currently known or future-developed network.

The above computer-readable storage medium may be included in the above electronic device, or may exist alone without being assembled into the electronic device.

The computer program codes for executing the operations of the present disclosure may be written in one or more programming languages or a combination thereof. The above programming languages include, but not limited to, object-oriented programming languages, such as Java, Smalltalk and C++, and also include conventional procedural programming languages, for example, "C" language or similar programming languages. The program codes may be executed entirely on a user computer, partly on the user computer, as an independent software package, partly on the user computer and partly on a remote computer, or entirely on the remote computer or a server. In the case of the remote computer, the remote computer may be connected to the user computer through any type of networks, including the LAN or WAN, or may be connected to an external computer (for example, using an Internet service provider to connect through the Internet).

The flowcharts and block diagrams in the accompanying drawings of the present disclosure show the possible architecture, functions, and operations of systems, methods, and computer program products according to various embodiments of the present disclosure. In this regard, each block in the flowcharts or block diagrams can represent a module, a program segment or a part of codes, and the module, the program segment or the part of the codes contains one or more executable instructions for implementing the defined logical functions. It should also be noted that in some implementations as alternatives, the functions labeled in the blocks can occur in an order different from the order labeled in the accompanying drawings. For example, two sequentially shown blocks can be substantially executed in parallel in fact, and they sometimes can also be executed in a reverse order, depending on related functions. It should also be noted that each block in the block diagrams and/or the flowcharts and the combination of the blocks in the block diagrams and/or the flowcharts can be implemented by a dedicated system based on hardware for executing defined functions or operations, or can be implemented by a combination of the dedicated hardware and computer instructions.

The units described in the embodiments of the present disclosure may be implemented in a software fashion or may be implemented in a hardware fashion. The names of the units do not constitute a limitation to the units in some cases.

The functions described above herein may be performed, at least in part, by one or more hardware logic components. For example, non-restrictively, exemplary types of hardware logic components that can be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program for use by or in conjunction with an instruction execution system, apparatus or device. The machine-readable medium may be a machine-readable signal medium or a machine-readable storage medium. The machine-readable medium may include, but not limited to, an electronic, magnetic, optical, electromagnetic, infrared or semiconductor system, apparatus or device, or any suitable combination of the foregoing. A more specific example of the machine-readable storage medium includes an electrical connection based on one or more wires, a portable computer disk, a hard disk, a random-access memory (RAM), a read-only memory (ROM), an erasable programmable read-only memory (an EPROM or a flash memory), optical fiber, a portable compact disk read-only memory (CD-ROM), an optical storage device, a magnetic storage device, or any suitable combination of the above content.

The foregoing description is only the description of preferred embodiments of the present disclosure and the used technical principle. A person skilled in the art should understand that the scope of the present disclosure in the present disclosure is not limited to a technical solution formed by a specific combination of the foregoing technical features. In addition, other technical solutions formed by any combination of the foregoing technical features or equivalent features thereof shall be encompassed without departing from the concept of the present disclosure. For example, the technical solutions formed by mutual replacement between the foregoing features and the technical features having similar functions (however, the technical features are not limited thereto) disclosed in the present disclosure shall be encompassed.

Furthermore, although a specific order is used to depict the operations, this should not be interpreted that these operations are required to be performed in the specific order shown or in sequential order of execution. Multitasking and parallel processing may be advantageous in particular environments. In addition, while several specific implementation details are included in the above discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable sub-combination.

Although the present subject matter has been described using language specific to structural features and/or method logical actions, it should be understood that the subject matter defined in the appended claims is not necessarily limited to the particular features or actions described above. Rather, the particular features and actions described above are merely exemplary forms of implementing the claims.

What is claimed is:

1. A method for circumventing an object, comprising:

in response to determining an object to be circumvented in a walking process of a self-walking device, moving in a direction away from the object to be circumvented, by the self-walking device and according to information of the object, to an observation position where the self-walking device obtains observation information comprising whether a hidden obstacle is present around the object, and determining at the observation position away from the object, by the self-walking device, whether the hidden obstacle is present around the object; wherein an included angle between a connection line direction and an original walking direction of the self-walking device before movement does not exceed 90 degrees, and the connection line direction extends from a center point of the object to the observation position;

determining according to the observation information obtained at the observation position, by the self-walking device in response to the hidden obstacle being present around the object, a navigation route of avoiding the object and the hidden obstacle; and performing, by the self-walking device, navigation according to the navigation route.

2. The method according to claim 1, wherein in response to determining that the object is an obstacle, the determining the navigation route according to the observation information obtained at the observation position specifically comprises: determining whether the observation information obtained at the observation position contains another obstacle as the hidden obstacle located in the original walking direction and located around the object, and determining the navigation route according to a result of the determining of whether the observation information obtained at the observation position contains the another obstacle.

3. The method according to claim 2, wherein in response to determining that the observation information contains the another obstacle, the determining the navigation route comprises: determining a route of avoiding the object and the another obstacle, and returning to the original walking direction as the navigation route.

4. The method according to claim 3, wherein the performing the navigation according to the navigation route comprises:

in a process of avoiding the another obstacle, moving, according to information of the another obstacle, to another observation position in a direction away from the another obstacle, obtaining another observation information at the another observation position, and updating the navigation route according to the another observation information.

5. The method according to claim 1, wherein in response to determining that the object is a wall corner, the determining the navigation route according to the observation information obtained at the observation position specifically comprises: determining whether the observation information obtained at the observation position contains an obstacle as the hidden obstacle located behind the wall corner, and determining the navigation route according to a result of the determining of whether the observation information obtained at the observation position contains the obstacle.

6. The method according to claim 5, wherein in response to determining that the observation information contains the obstacle located behind the wall corner, the determining the navigation route comprises: determining a route of walking around the wall corner and avoiding the obstacle as the navigation route.

7. The method according to claim 1, wherein in response to determining that the object is an obstacle, the moving to the observation position comprises:

circumventing the obstacle according to an obstacle avoidance strategy; wherein in a process of the circumventing, the self-walking device moves to a key position where an included angle between a walking direction of the self-walking device and the original walking direction exceeds a preset angle value; and moving, according to a preset strategy, from the key position to the observation position in a direction away from the obstacle;

wherein the performing the navigation according to the navigation route specifically comprises:

moving from the observation position back to the key position, and continuing to perform the navigation according to the navigation route.

8. The method according to claim 7, wherein the moving, according to the preset strategy, from the key position to the observation position in the direction away from the obstacle comprises:

firstly rotating to right by a preset angle, and then moving back by a preset distance.

9. The method according to claim 1, wherein in response to determining that the object is a wall corner, the moving to the observation position comprises:

moving, along the original walking direction, to a key position beside the wall corner; wherein an included angle between a connection line direction extending from a corner vertex of the wall corner to the key position and the current walking direction is around 90 degrees; and moving, in a direction away from the wall corner, from the key position to the observation position.

10. The method according to claim 2, wherein a boundary distance between the another obstacle and the object is less than a first preset value; wherein the first preset value is greater than or equal to a length or width of a machine body.

11. The method according to claim 1, wherein the walking process of the self-walking device specifically comprises: a walking process of the self-walking device in an along-the-wall mode.

12. A non-transitory computer-readable storage medium, storing a computer program that, when executed by a processor, causes the processor to perform a method for circumventing an object, wherein the method comprises:

in response to determining an object to be circumvented in a walking process of a self-walking device, moving in a direction away from the object to be circumvented, by the self-walking device and according to information of the object, to an observation position where the self-walking device obtains observation information comprising whether a hidden obstacle is present around the object, and determining at the observation position away from the object, by the self-walking device, whether the hidden obstacle is present around the object; wherein an included angle between a connection line direction and an original walking direction of the self-walking device before movement does not exceed 90 degrees, and the connection line direction extends from a center point of the object to the observation position;

determining according to the observation information obtained at the observation position, by the self-walking device in response to the hidden obstacle being present around the object, a navigation route of avoiding the object and the hidden obstacle; and performing, by the self-walking device, navigation according to the navigation route.

13. An electronic device, comprising:

one or more processors; and a storage apparatus, used for storing one or more programs, wherein the one or more processors, through executing the one or more programs, are configured to perform a method for circumventing an object, and the method comprises:

in response to determining an object to be circumvented in a walking process of a self-walking device, moving in a direction away from the object to be circumvented, by the self-walking device and according to information of the object, to an observation position where the self-walking device obtains observation information comprising whether a hidden obstacle is present around the object, and determining at the observation position away from the object, by the self-walking device, whether the hidden obstacle is present around the object; wherein an included angle between a connection line direction and an original walking direction of the self-walking device before movement does not exceed 90 degrees, and the connection line direction extends from a center point of the object to the observation position;

determining according to the observation information obtained at the observation position, by the self-walking device in response to the hidden obstacle being present around the object, a navigation route of avoiding the object and the hidden obstacle; and performing navigation according to the navigation route.

14. The electronic device according to claim 13, wherein in response to determining that the object is an obstacle, the determining the navigation route according to the observation information obtained at the observation position specifically comprises: determining whether the observation information obtained at the observation position contains another obstacle as the hidden obstacle located in the original walking direction and located around the object, and determining the navigation route according to a result of the determining of whether the observation information obtained at the observation position contains the another obstacle.

15. The electronic device according to claim 14, wherein in response to determining that the observation information contains the another obstacle, the determining the navigation route comprises: determining a route of avoiding the object and the another obstacle, and returning to the original walking direction as the navigation route.

16. The electronic device according to claim 15, wherein the performing the navigation according to the navigation route comprises:

in a process of avoiding the another obstacle, moving, according to information of the another obstacle, to another observation position in a direction away from the another obstacle, obtaining another observation information at the another observation position, and updating the navigation route according to the another observation information.

17. The electronic device according to claim 13, wherein in response to determining that the object is a wall corner, the determining the navigation route according to the observation information obtained at the observation position specifically comprises: determining whether the observation information obtained at the observation position contains an obstacle as the hidden obstacle located behind the wall corner, and determining the navigation route according to a result of the determining of whether the observation information obtained at the observation position contains the obstacle.

18. The electronic device according to claim 17, wherein in response to determining that the observation information contains the obstacle located behind the wall corner, the determining the navigation route comprises: determining a route of walking around the wall corner and avoiding the obstacle as the navigation route.

19. The electronic device according to claim 13, wherein in response to determining that the object is an obstacle, the moving to the observation position comprises:

circumventing the obstacle according to an obstacle avoidance strategy; wherein in a process of the circumventing, the self-walking device moves to a key position where an included angle between a walking direction of the self-walking device and the original walking direction exceeds a preset angle value;

moving, according to a preset strategy, from the key position to the observation position in a direction away from the obstacle; and wherein the performing the navigation according to the navigation route specifically comprises: moving from the observation position back to the key position, and continuing to perform the navigation according to the navigation route.

20. The electronic device according to claim 19, wherein the moving, according to the preset strategy, from the key position to the observation position in the direction away from the obstacle comprises: firstly rotating to right by a preset angle, and then moving back by a preset distance.

* * * * *